United States Patent Office.

WILLIAM HENRY SNOW, OF HIGH POINT, NORTH CAROLINA, ASSIGNOR TO THE MODERN TOBACCO BARN COMPANY, OF NORTH CAROLINA.

PROCESS OF CURING TOBACCO.

SPECIFICATION forming part of Letters Patent No. 448,595, dated March 17, 1891.

Application filed December 23, 1889. Serial No. 334,747. (No specimens.)

*To all whom it may concern:*

Be it known that I, WILLIAM HENRY SNOW, a citizen of the United States, residing at High Point, in the State of North Carolina, have invented certain new and useful Improvements in Processes of Curing Tobacco, of which the following is a full, clear, and exact description, reference being had to the accompanying drawings, forming a part of this specification.

My invention relates to the preparation of ripened green tobacco-leaves necessary to bring them into a proper condition for manufacturing and commercial purposes; and to that end it consists of a new and improved method or process involving the several separate and successive steps, first, of sweating and yellowing the leaf; second, of drying out the leaf and fixing the color, and third of finally curing the leaf; also, of afterwards naturally drying the leaf in a dry atmosphere at a reduced temperature, and finally casing or softening the leaf fibers, as hereinafter fully described.

Tobacco-leaves have been heretofore cured both upon the stalk and also after separation therefrom, but in the latter case all the leaves are usually plucked at the same time. As only the stalk contains nicotianine and extends its bitterness into the leaves when dried with it, and as the greater part of the nicotine is contained between the wood and outside skin of the stalk a curing of the leaf separately will produce a finer and sweeter flavored tobacco, richer in oils and also of greater weight. My process applies only to this mode, but instead of making one harvesting the leaves should be plucked only when fully ripe, and as the various leaves on the stalk ripen at different periods in the growth of the plant, I prefer to make three or more harvestings in order to obtain all the leaves in a fully ripe condition before plucking them—for instance, the "primings" usually ripen first about July; about a month later the "lugs" are matured, then follow the main leaves about September, and finally about October the "tips" are fully matured. It is well known that primings and lugs which ripen before the upper leaves produce the brightest and mildest smokers if not plucked and cured in an unripe condition, and so also are the tips of better quality if not plucked with the main leaves, but allowed to remain on the stock until fully matured. And finally, it is manifest that leaves in various stages of ripening cannot be simultaneously cured and produce a uniform product. For the purpose of drying and curing them, I prefer to make use of the apparatus patented to me by Letters Patent of the United States, No. 322,330, dated July 14, 1885. It is essential that the leaves to be cured should be held separated from each other, and if strung upon wires, as described in said patent, should be wired back to back to prevent them curling around each other when drying, and before closing the barn and applying artificial heat for this purpose the leaves should be allowed to dry naturally for twelve to twenty-four hours to slowly evaporate the sap in the stems and fibers without artificial aid. The apparatus in which the tobacco-leaves are thus placed, in the first instance, as aforesaid—that is, strung on wires and separated from each other—should then be closed as nearly air-tight as practicable, and the leaves then subjected to a "sweating" by means of radiated dry heat in a quiescent state applied to the leaves preferably by means of pipes passing through the inclosure from a furnace near the same, the heat being maintained at a temperature of about 80° Fahrenheit for about twenty-four to thirty-six hours, this being the temperature and length of exposure at and in which the sweating, which is a fermentation and drying out of the sap-cells in the leaves, will be most perfectly effected and the leaves brought to a greenish-yellow color. Having arrived at this stage, and a satisfactory color obtained, the temperature is raised gradually at about two and one-half degrees per hour until maximum temperature is 115° Fahrenheit, and kept at that point for ten to twelve hours, the effect being to fix the color, the graduation of the heat preventing a burning of the leaves which would be occasioned by a sudden increase of heat. For the "curing" proper, which is the next step in the process, the temperature should be now raised gradually during the succeeding twelve hours to a point not exceeding 140°, and during the whole of this stage of the process, a ventilating current of air must be directed between the dried leaves, preferably by opening the dampers at the top of the apparatus and the draft-holes in the bottom, or by other suitable means. This temperature at this stage of the process should be maintained until the leaves are thoroughly cured, when the stem of leaf will snap like a piece of glass, and the period of time during which the leaves should be exposed to this temperature and current of air as stated, must not be less than twenty-four hours and from that to thirty-six hours. If this is properly accomplished, the leaves may be bulked down in a body without fear of swelling stems or molding and if packed close will improve in color the longer they remain so.

As tobacco sweats during the first-described stage of the process—viz., the sweating and yellowing of the leaf—it is desirable that the dampness which thus permeates the atmosphere should be drawn off, which is best effected by means of ducts arranged at or near the floor of the curing apparatus, and may be there connected to the heaters or furnaces so as to create a suction. The effect of this will be that during the subsequent curing stage of the process the dampness previously given off by the leaves is drawn downward to the bottom of the apparatus, while the current of hot dry air is constantly moving upward and at a uniform temperature among the leaves; hence the whole stock of tobacco is being cured evenly and without any part of it being baked or overheated.

These three several stages described complete the yellowing and curing proper of the leaves, after which I prefer that they should be subjected to a natural drying, which is best done in the open air, if the atmosphere be dry, by opening all the doors and drafts in the barn or curing apparatus, and allowing the outside air to circulate freely through the tobacco-leaves. If, however, the outside atmosphere is damp, the drying is effected by maintaining the dry atmosphere in the barn or apparatus by means of the furnace heat at a reduced temperature of about 70° Fahrenheit, the drying being usually completed in about twelve to twenty-four hours. The leaves and stems are now in a dry and brittle condition, and it is necessary to soften the fiber of the leaf in order to put it in condition in which it will not break or crumble by handling, and for this purpose after the tobacco-leaves have become thoroughly dry, the apparatus being closed, a small quantity of steam is admitted at intervals of several hours during two or three days, or, the apparatus being opened, the floor of the barn is liberally sprinkled with water, the effect being to remove the brittleness of the leaf and put it in condition for handling without breaking or crumbling, leaving the fiber of the leaf soft and the stem hard, and if cured by the process I have described will remain in that condition for an indefinite period without regard to the condition of the external atmosphere, because my curing process in its three several stages, as described, results in a retention in the leaves of the natural wax and prevents them from becoming too dry or brittle. My process, as described, has the additional advantages of producing more uniform grades of resultant cured tobacco-leaves, and the maintenance of tobacco "in case" at all seasons of the year obviates to a great extent all danger of May sweats, retains the wax in the leaves as well as the aroma, besides yellowing, drying, and curing the tobacco in very much less time than that heretofore and usually employed, and with less labor and expense.

Having thus described my improved process, what I claim as new and of my invention is—

1. The herein-described process of preparing ripened green tobacco-leaves, consisting of the following several and successive steps: first, supporting the leaves separated from each other and in a closed chamber, and sweating and yellowing the same therein at a practically uniform temperature of about 80° Fahrenheit for a period of twenty-four to thirty-six hours; second, drying out the dampness of the leaves and fixing the color thereof by a gradual raising of the temperature in said chamber to a maximum of 115° Fahrenheit during a period of about ten hours, and, finally, curing the leaves by subjecting them to a moving current of radiated hot dry air at a gradually-raised maximum temperature of 140° Fahrenheit for the period of time and in the manner set forth, substantially as described.

2. The herein-described process of preparing ripened green tobacco-leaves, consisting of the following several and successive steps: first, supporting the leaves separated from each other and in a closed chamber and sweating and yellowing the same therein at a practically uniform temperature of about 80° Fahrenheit for a period of twenty-four to thirty-six hours; second, drying out the dampness of the leaves and fixing the color thereof by a gradual raising of the temperature in said chamber to a maximum of 115° Fahrenheit during a period of about ten hours; thirdly, curing the leaves by subjecting them to a moving current of radiated hot dry air at a gradually-raised maximum temperature of 140° Fahrenheit for the period of time and in the manner set forth, and, finally, again drying the separated leaves at a reduced temperature of about 70° Fahrenheit in a dry atmosphere for a maximum period of about twenty-four hours, and then dampening the same by absorption, substantially as described.

In testimony whereof I have hereunto affixed my signature this 18th day of November, A. D. 1889.

WILLIAM HENRY SNOW.

Witnesses:
E. D. STEELE,
H. T. FENTON.